United States Patent Office 2,763,604
Patented Sept. 18, 1956

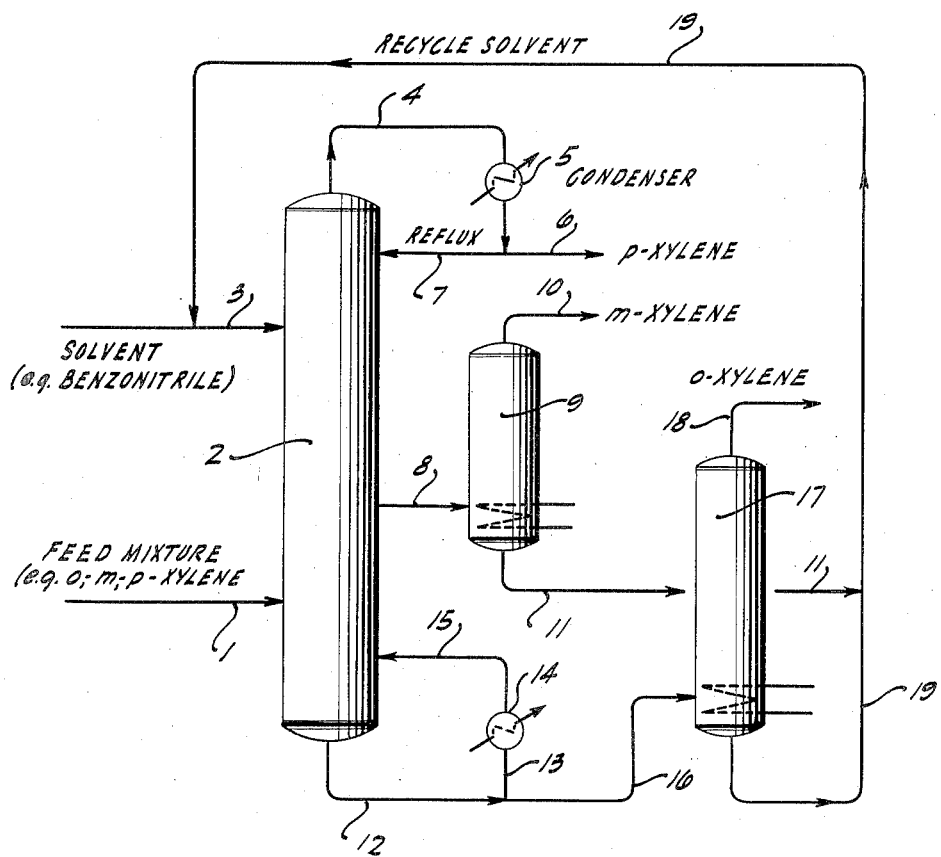

2,763,604

EXTRACTIVE DISTILLATION PROCESS EMPLOYING BENZONITRILE AS EXTRACTION AGENT

William Smith Dorsey, Fullerton, William D. Schaeffer, Ontario, and Carleton B. Scott, Pomona, Calif., assignors to Union Oil Company of California, Los Angeles, Calif., a corporation of California Application June 6, 1952, Serial No. 292,038

3 Claims. (Cl. 202—39.5)

This invention relates to the separation of close boiling mixtures of aromatic compounds belonging to the same chemical series. More specifically it is concerned with extractive distillation procedures whereby the feed mixture to be separated is volatilized and rectified in a fractionating column in the presence of a liquid solvent, or selective vapor pressure depressant, whereby the vapor pressure of one or more of the components is depressed to a greater extent than that of other components, thereby permitting the latter components to distill overhead. The invention is specifically directed to the use of certain classes of selective vapor pressure depressants which are chosen to give optimum effects with the particular mixture to be separated.

The invention is particularly applicable to the separation of mixtures of aromatic hydrocarbon isomers. In the chemical utilization of various aromatic compounds, it is usually desirable and frequently necessary to separate various isomers in order that they may be further utilized for chemical purposes. Thus, for the manufacture of terephthalic acid by oxidation of para-xylene, it is desirable to remove substantially all meta-xylene and ortho-xylene as well as ethylbenzene from the para-xylene. Inasmuch as the boiling points of these isomers are very similar, the desired separation is not obtained by means of ordinary distillation, nor do azeotropes of these compounds display a sufficient difference in boiling points to permit effective fractionation. Various other processes such as fractional crystallization, extraction with hydrofluoric acid-boron trifluoride mixtures, and selective sulfonation have been employed in the past, but such processes ordinarily involve elaborate and expensive equipment and/or the use of special materials of construction to minimize corrosion. Moreover, the degree of separation obtainable by such processes is often not satisfactory.

With the rapid development in recent years of special petroleum refining techniques such as catalytic reforming, hydrogenation, hydroforming, etc. large volumes of difficultly separable mixtures of isomeric alkylated aromatic hydrocarbons having similar boiling points have been produced in large quantities. When applied to such uses as motor fuels these mixtures are usable without separation of the constituents. However, as indicated, in the use of these materials for chemical purposes it is desirable to have available the individual compounds and not a mixture of isomers. A mixture of ortho-, meta- and para-xylenes and ethylbenzene is representative of such mixtures of isomeric aromatic hydrocarbons which are produced in certain petroleum refining operations. For purposes of chemical conversion for example, of ortho-xylene to phthalic anhydride, of para-xylene to terephthalic acid, and of ethylbenzene to styrene, it is desirable to effect a separation of the individual constituents.

The term "aromatic" as employed herein in designating the solvents and the compounds to be separated, is used in the broad sense and is intended to include all resonance-stabilized, cyclic, unsaturated compounds which exhibit predominantly substitution rather than addition reactions towards electrophilic reagents such as halogens (cf., Remick, A. E., Electronic Interpretations of Organic Chemistry, 2nd Ed., Wiley & Sons, New York, 1949).

The solvents, or vapor pressure depressants, employed herein include some compounds which have been previously employed in extractive distillation to separate mixtures, the components of which belong to different chemical series of hydrocarbons such as paraffins and olefins, paraffins and naphthenes, aromatics and non-aromatics, etc. However, such materials have not been applied for separating compounds belonging to the same chemical series, or to mixtures of isomeric aromatic hydrocarbons, and have in fact been indicated as inoperative for such purposes (cf. U. S. Patent No. Reissue 22,379). However, it is characteristic of the present invention that not all the solvents which have been previously employed for separating different chemical types of hydrocarbons are suitable for separating hydrocarbons of the same chemical series disclosed herein. For example, phenolic compounds and amino compounds are generally not suitable for such purposes. The term "same chemical series," as employed herein, means that the compounds so designated contain the same aromatic nucleus and the same type, but not necessarily number, of susbtituents on the ring.

It is therefore a broad object of this invention to provide improved means for the separation of mixtures of aromatic hydrocarbons of the same chemical series, regardless of the number of atoms in the ring or rings, and regardless of the number or type of substitutents on the ring, provided only that such compounds boil in a temperature range which makes distillation practicable.

A more specific object of the invention is to provide efficient and economical methods for the separation of mixtures of isomeric alkyl substituted aromatic compounds.

A further object is to provide a process for the resolution of mixtures of ortho-xylene, meta-xylene, para-xylene and ethylbenzene.

Specifically, in regard to any of the above objects, it is further desired to provide suitable classes of solvents which may be conveniently utilized for selectively depressing the vapor pressure of one or more components of the mixtures described.

These and other objects will be better understood from the detailed description of the invention hereinafter set forth.

The general procedure for practicing extractive distillation is well known in the art, and is generally executed by causing the selective solvent such as benzonitrile to flow down a fractionating column as the distillation proceeds and as the feed vapors ascend the column from the kettle or boiler at the bottom of the column. Thus, the solvent contacts the ascending vapors and selectively depresses the volatility of those compounds which are most readily associated or complexed with the solvent. The feed rates and column temperatures are so adjusted that the component whose vapor pressure is least depressed is taken overhead at the desired purity, and the fat solvent may be removed from the bottom of the still and stripped for recovery of the least volatile materials. As in ordinary distillation, a portion of the overhead product or products may be returned to the column after condensation as reflux, the reflux inlet being ordinarily positioned some distance above the solvent feed inlet. The component or components dissolved in the solvent are recovered by stripping the extract as indicated and the lean solvent is then recirculated ordinarily to a point near the top of the distillation column. Preferably the recycled solvent is introduced at approximately the same temperature prevailing in the column at the point of introduction. The distillation may be conducted at substantially any desired pressure, atmospheric, sub-atmospheric, or super-atmospheric, which is practical for the particular solvent and feed mixture employed.

The extractive distillation process may be, and preferably is, carried out in a continuous manner, the feed mixture to be separated being continuously introduced into the column at a point below the solvent feed. In this operation, instead of heating the extract at the base of the column to supply the vapor to partially strip the descending fat solvent, a portion of the overhead vapors produced during regeneration of the solvent for recovery of the dissolved constituent in a separate fractionating column may be returned near the bottom of the extractive distillation column as a bottoms reflux.

The —CN group in the aromatic nitriles employed herein is theoretically an electron-withdrawing, or meta-directing group, and imparts to the carbon atoms making up the aromatic ring a slight positive charge. This positive charge favors the formation of weak complexes with those components of the feed mixture which are most electronegative, i. e. those which contain the strongest ortho-para directing combination of substituents on the ring. Of the alkaryl hydrocarbons containing two alkyl substituents, the meta isomer is generally the strongest ortho-para directing combination since the ortho-para directing tendencies of each substituent meta-group tend to reinforce each other, while ortho and para substituents conflict with each other in this respect. For example, in a meta- and para-xylene mixture, the aromatic nitriles are found to complex with meta-xylene to a greater degree than with para-xylene thereby causing a relatively greater decrease in volatility of metha-xylene than of para-xylene. Therefore in carrying out an extractive distillation of such a mixture with an aromatic nitrile the meta-xylene would tend to accumulate in the still bottoms, while the para-xylene is more readily removable as overhead. In general it may be said that the isomers having the least electronegative ring, regardless of whether they may be mono, di, tri or tetra substituted, will display the least inherent tendency to associate or complex with molecules of the solvent and will therefore be removable as overhead, assuming that the original boiling point of the isomer with the least electronegative ring is not more than about 4° C. or 5° C. above that of the isomer with the most electronegative ring.

The process is generally most effective for separating those isomer mixtures wherein the component with the least electronegative ring is originally the most volatile component. In this case the vapor pressure depressant effect of the solvent accentuates the original differences in vapor pressure of the components. In those cases where the component with the least electronegative ring is the highest boiling, the natural differences in boiling points must be reversed in order to take that particular component overhead.

The solvents, or vapor pressure depressants, employed herein consist essentially of aromatic nitriles. They may be either liquid or solid materials at the distillation temperature. If a solid is employed it may be dissolved in a liquid solvent which may or may not in itself be a vapor pressure depressant. Gross physical requirements necessitate only that the total solvent be a liquid at the distillation temperature, that it be stable and non-reactive at such temperature, and that it should preferably boil at least about 30°–40° C. above the boiling point of the most non-volatile constituent in the feed mixture. Suitable examples of solvents which may be employed herein include for example benzonitrile, 3-cyano benzothiophene, benzoic acid dissolved in benzonitrile, and any such materials dissolved in other solvents.

Examples of isomeric mixtures which may be separated are illustrated in the following table:

TABLE I

| Isomer Mixture | Boiling Point of Components, °C. |
| --- | --- |
| meta-xylene | 139.1 |
| para-xylene | 138.4 |
| ortho-xylene | 144.4 |
| ethylbenzene | 136.2 |
| α methyl naphthalene | 241-2 |
| β methyl naphthalene | 241-2 |
| 1,2,3-trimethyl benzene | 176.5 |
| 1,2,4-trimethyl benzene | 169.8 |
| 1,3,5-trimethyl benzene | 164.6 |
| p-ethyl toluene | 162 |
| m-ethyl toluene | 162.5 |
| o-ethyl toluene | 162 |
| 1,2,3,4-tetramethyl benzene (Prehnitene) | 204 |
| 1,2,3,5-tetramethyl benzene (Isodurene) | 197 |
| 1,2,4,5-tetramethyl benzene (Durene) | 193-5 |

The methods employed herein are applicable not only to the separation of isomers in the strict sense of the word, but to the separation of any close-boiling mixture of hydrocarbons belonging to the same chemical series, though they may differ in molecular weight.

The process may be practiced in an apparatus such as that illustrated in the drawing, which is designed for continuous operation. The mixture of compounds to be separated, for example a mixture of o-, m-, and p-xylene, is introduced through line 1 into a packed or bubble plate fractionating column 2. The feed mixture may be introduced either in the liquid or vaporous state, but in either case the thermal conditions in the column are such that the feed mixture ascends the column 2 in a vaporous state and contacts countercurrently the liquid solvent which is introduced near the top of column 2 through line 3. It is preferable that the solvent should boil at least about 40° C. higher than the feed mixture in order that clean separation of solvent and feed may be obtained. The weight ratio of solvent to feed may vary over a wide range, for example, between about 0.5 to about 50. The preferred ratios for most operations lies between about 1 and about 10. As the feed vapor pass-up the column, some of the components, e. g., m- and o-xylene are preferentially absorbed in the descending solvent and the liquid mixture is collected in a pool in each of the plates, if a plate column is employed. The temperature gradient of the column is such that the descending liquid mixture is at its boiling point and is continuously being contacted with vapors from the lower stages of the column. The solvent should be so selected that, at the particular temperatures and solvent feed ratios employed, the liquid mixture will consist of a homogeneous phase.

The vaporous overhead, consisting essentially of p-xylene, is removed through line 4 and passed through a condenser 5. The liquid condensate is divided into an overhead product effluent which is taken off through line 6, and a reflux which is returned to the column through line 7. The ratio of reflux to effluent determines the reflux ratio, which should preferably range between about 1 and about 20. By suitable variations in the efficiency of the fractionating column, i. e., in its number of theoretical plates, and in the solvent/feed ratio, and the reflux ratio, substantially any desired purity may be obtained for the overhead effluent removed at 6, as will be readily understood by those skilled in the art.

If a three-component feed mixture is employed as in the present instance, a liquid side-cut may be drawn off through line 8 at any desired location along the length of column 2. The side-cut is transferred to a distillation column 9 where the solvent is stripped of its dissolved component. The overhead is removed through line 10, and is found to consist essentially of m-xylene if the cut-point in column 2 is properly selected. The bottoms from distillation column 9 is removed through line 11 and recycled via line 19 to extractive distillation column 2.

The fat solvent which collects in the bottom of extractive distillation column 2 is removed through line 12 and divided into two streams A and B. Stream A passes through line 13 into reboiler 14 in order to partly vaporize the entrained feed components, and the liquid-vapor mixture is then recycled to column 2 through line 15 as bottoms reflux. Portion B of the fat solvent is passed through line 16 into a second fractionating column 17 wherein the solvent is stripped of the components in the feed mixture which were least volatile in the presence of the solvent, e. g., o-xylene. This component is vaporized and removed overhead through line 18. Those skilled in the art will readily appreciate that the purity of the component removed through line 18 may be varied by adjusting the ratio of fat solvent which is recycled to the column through line 15 to that which is passed into column 17 for stripping. The bottoms collecting in fractionator 17 consists of lean solvent which is withdrawn through line 19 and recycled to line 3.

The above procedure illustrates merely one type of operation in which the process may be practiced. Although continuous type operation is preferred, the process may also be practiced in a batchwise manner.

The process may perhaps be better understood by reference to the following specific examples, which are given by way of illustration and should therefore not be interpreted as excluding other possible modes of operation.

*Example I*

A feed mixture consisting of about 60% meta-xylene, 30% para-xylene, and 10% ortho-xylene by volume is vaporized and introduced into the lower section of a 30 plate continuous fractionating column at the rate of about 8 pounds per hour. Liquid benzonitrile is introduced near the top of the column at about 80 pounds per hour. A reflux ratio of about 10:1 is maintained. The effluent overhead consists of about 95% p-xylene.

A liquid side-cut is taken from the column at a point about 18 plates from the top of the top thereof and stripped of its dissolved component. The side-cut distillate is found to consist of about 90% m-xylene.

The bottoms product from the fractionating column is transferred to a stripping column to yield an overhead consisting of about 99% o-xylene.

*Example II*

A mixture consisting of 60 parts by volumn of meta-xylene, 24 parts of para-xylene, 8.5 parts of ethylbenzene, and 7.5 parts of ortho-xylene was distilled batchwise at atmospheric pressure in a glass helices packed fractionating column corresponding to about 13 theoretical plates. The boil up was about 400 ml. per hour and the reflux ratio was about 10 to 1. The column was operated at total reflux for 2 hours until approximate equilibrium conditions had been reached. After adjusting the reflux ratio at 10:1, the effluent overhead was collected in a series of fractions, each amounting to about 2% of the still charge. These fractions were analyzed for meta-, para-, and ortho-xylene and ethylbenzene.

The above procedure was repeated except that benzonitrile, preheated to the column temperature, was introduced near the top of the fractionating column at a rate of about 660 ml. per hour, and the boil up of hydrocarbon isomers was maintained at about 560 ml. per hour. This provided an effective volume ratio of solvent to charge stock of about 1.18. The column included a stripping section at the bottom whereby the hydrocarbons were stripped from the benzonitrile, which was continuously recycled. The reflux ratio indicated above was sufficient to exclude any benzonitrile in the overhead. Effluent overhead fractions were removed and analyzed as indicated above. The following data shows the distribution of meta-, para-, and ortho-xylene and ethylbenzene in the respective overhead fractions which were collected after 20% of the respective charges had been distilled.

| | meta-xylene, Vol. Percent | para-xylene, Vol. Percent | ethyl benzene, Vol. Percent | ortho-xylene, Vol. Percent |
|---|---|---|---|---|
| Charge | 60 | 24 | 8.5 | 7.5 |
| Overhead, no entrainer | 56 | 22.5 | 19.5 | 2.0 |
| Overhead, benzonitrile entrainer | 61 | 30.0 | 8.0 | 0.5 |

The above data shows that the ratio of meta- to para-xylene in the overhead when no entrainer is employed is 2.49 as compared to 2.5 in the charge. On the other hand, when benzonitrile is employed, the ratio of meta- to para-xylene is reduced to 2.03, which represents a substantial separation of para-xylene, as compared to the charge. By employing a more efficient fractionating column, e. g. one equivalent to at least about 30 theoretical plates, and higher solvent/feed ratios e. g. between about 5 and 15, the concentration of para-xylene in the overhead may be increased to 90% or more. Under these conditions a bottoms product may be obtained consisting of over 99% o-xylene.

This example shows also that the volatility of ethylbenzene and ortho-xylene is markedly reduced, relative to para-xylene, by employing benzonitrile. A continuous fractionating column may therefore be operated in such manner as to remove ortho-xylene as bottoms, either substantially pure, or along with most of the ethylbenzene. These latter two materials may then be separated by conventional fractional distillation if desired. The predominant part of the meta-xylene may be removed either as overhead from a second extractive distillation column for the still bottoms, or as a side-cut from the first column.

From the foregoing description it will be seen that the process herein described constitutes an efficient and economical means for separating close boiling mixtures of chemically similar compounds, which mixtures have in the past constituted a difficult separation problem in the chemical industries.

The electronic theories expressed herein which are believed to satisfactorily explain the behavior of the solvents in relation to the components of the feed mixtures should not be interpreted as excluding other possible theoretical explanations. The actual invention is based upon the facts observed and set forth, and should therefore not be restricted to conformance with any particular theory.

The foregoing disclosure is not to be considered as limiting since many variations may be made by those skilled in the art without departing from the scope or spirit of the following claims.

We claim:
1. A process for producing a para-xylene concentrate from a feed mixture consisting essentially of para-xylene plus at least one member from the group consisting of meta-xylene, ortho-xylene and ethylbenzene, which comprises subjecting said feed mixture to extractive distillation in a fractionating column countercurrently to a descending liquid stream of a solvent consisting essentially of benzonitrile, and removing overhead a concentrate containing a higher proportion of p-xylene than was present in said feed mixture.

2. A process for obtaining substantially pure para-xylene from a hydrocarbon mixture consisting essentially of para-xylene plus at least one member from the group consisting of meta-xylene, ortho-xylene and ethylbenzene, which comprises continuously distilling said mixture in a fractionating column equivalent to at least about thirty theoretical plates counter-currently to a descending liquid stream of a solvent consisting essentially of benzonitrile, maintaining the weight ratio of said solvent to said mixture at between about 5 and 15, maintaining a reflux ratio at the top of said column of at least about 10, and withdrawing from said column an overhead consisting essentially of para-xylene.

3. A process for resolving a mixture consisting essentially of ortho-xylene, meta-xylene and para-xylene, which comprises continuously distilling said mixture in a fractionating column equivalent to at least about thirty theoretical plates countercurrently to a descending liquid stream of a solvent consisting essentially of benzonitrile, withdrawing an overhead from said column consisting essentially of para-xylene, withdrawing and stripping a side cut from said column to obtain a fraction consisting essentially of meta-xylene, and withdrawing and stripping bottoms from said column to obtain a fraction consisting essentially of ortho-xylene.

References Cited in the file of this patent

UNITED STATES PATENTS

| | | |
|---|---|---|
| 2,288,126 | Dunn et al. | June 30, 1942 |
| 2,407,997 | Patterson | Sept. 24, 1946 |
| 2,494,274 | Woernev | Jan. 10, 1950 |
| 2,532,031 | Nixon | Nov. 28, 1950 |
| 2,537,459 | Griswold | Jan. 9, 1951 |
| 2,567,228 | Morrell et al. | Sept. 11, 1951 |